(12) United States Patent
Braud et al.

(10) Patent No.: US 10,389,836 B2
(45) Date of Patent: Aug. 20, 2019

(54) METHOD FOR CONTROLLING RECOMMENDATION MESSAGES IN A COMMUNICATIONS NETWORK (71) Applicant: Orange, Paris (FR)

(72) Inventors: Arnaud Braud, Lannion (FR); Gael Fromentoux, Pleumeur Bodou (FR); Frederic Fieau, Paris (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/765,143

(22) PCT Filed: Sep. 29, 2016

(86) PCT No.: PCT/FR2016/052472
§ 371 (c)(1),
(2) Date: Mar. 30, 2018

(87) PCT Pub. No.: WO2017/055749
PCT Pub. Date: Apr. 6, 2017

(65) Prior Publication Data
US 2018/0288181 A1 Oct. 4, 2018

(30) Foreign Application Priority Data

Sep. 30, 2015 (FR) ..................................... 15 59317

(51) Int. Cl.
*H04L 29/08* (2006.01)
*H04L 12/46* (2006.01)
(Continued)

(52) U.S. Cl.
CPC ...... *H04L 67/2819* (2013.01); *H04L 12/4633* (2013.01); *H04L 63/0428* (2013.01);
(Continued)

(58) Field of Classification Search
CPC . H04L 67/2819; H04L 63/0428; H04L 69/03; H04L 12/4633; H04L 69/164;
(Continued)

(56) References Cited

U.S. PATENT DOCUMENTS

2018/0183688 A1* 6/2018 Mihaly ............... H04L 41/5025

OTHER PUBLICATIONS

Trammell, "Requirements for the design of a Substrate Protocol for User Datagrams (SPUD)", draft-trammell-spud-req-00, Jul. 6, 2015 , IETF.*

(Continued)

*Primary Examiner* — Jae Y Lee
(74) *Attorney, Agent, or Firm* — David D. Brush; Westman, Champlin & Koehler, P.A.

(57) ABSTRACT

A method for controlling, in a communications network, recommendation messages exchanged during a session between a first endpoint, referred to as a source entity, and a second endpoint, referred to as a receiving entity. The messages are exchanged via a tube grouping data packets of a communication protocol with no guarantee of the delivery of the data packets. The method includes: obtaining recommendations contained in the recommendation messages via a control entity located on a network path of the tube, the control entity being authorized by an operator of the communications network; calculating a new recommendation message, on the basis of the recommendations obtained and of at least one information item relating to conditions of the network provided by the control entity; and sending the new recommendation message to at least one network entity located at one end of the tube.

10 Claims, 2 Drawing Sheets

(51) Int. Cl.
*H04L 29/06* (2006.01)
*H04W 80/06* (2009.01)

(52) U.S. Cl.
CPC ............ *H04L 69/03* (2013.01); *H04L 69/164* (2013.01); *H04L 65/00* (2013.01); *H04L 67/42* (2013.01); *H04L 69/325* (2013.01); *H04W 80/06* (2013.01)

(58) Field of Classification Search
CPC ....... H04L 67/42; H04L 69/325; H04L 65/00; H04W 80/06
See application file for complete search history.

(56) References Cited

OTHER PUBLICATIONS

Hildebrand et al "Substrate Protocol for User Datagrams (SPUD) Prototype", draft-hildebrand-spud-prototype-03, Mar. 9, 2015, IETF.*
Trammell, "Architectural Considerations for Transport Evolution with Explicit Path Cooperation," draft-trammell-stackevo-explicit-coop-00, Sep. 23, 2015, IETF.*
International Search Report dated Dec. 16, 2016 for corresponding International Application No. PCT/FR2016/052472, filed Sep. 29, 2016.
English translation of the Written Opinion of the International Searching Authority dated Dec. 16, 2016 for corresponding International Application No. PCT/FR2016/052472, filed Sep. 29, 2016.
Trammell B et al, "Requirements for the design of a Substrate Protocol for User Datagrams (SPUD); draft-trammell-spud-req-OO.txt", Requirements for the Design of a Substrate Protocol for User Datagrams (SPUD); Draft-Trammell-Spud-Req-OO.Txt, Internet Engineering Task Force. I ETF; Standardworkingdraft, Internet Society (ISOC) 4, Rue Des Fa Lai Ses CH-1205 Geneva, Switzerland. Jul. 6, 2015 (Jul. 6, 2015), pp. 1-14, XP015107513.
Trammell B et al, "Architectural Considerations for Transport Evolution with Explicit Path Cooperation; draft-trammell-stackevo-explicit-coop-OO.txt", A Architectural Considerations for Transport Evolution With Explicit Path Cooperation; Draft-Trammell-Stackevo-Explicit-Coop-OO.Txt, Internet Engineering Task Force, IETF; Standardworkingdraft, Internet Society (ISOC) 4, Rue Des Falaises CH-1205 Genev.
Hildebrand Cisco Systems B Trammell ETH Zurich J: "Substrate Protocol for User Datagrams (SPUD) Prototype; draft-hildebrand-spud-prototype-03.txt", Substrate Protocol for User Datagrams (SPUD) Prototype; Draft-Hildebrand-Spud-Prototype-03.Txt, Internet Engineering Task Force, IEFT; Standardworkingdraft, Internet Society (ISOC) 4, Rue Des Falaises CH-1205 Geneva, Switzerland.

* cited by examiner

METHOD FOR CONTROLLING RECOMMENDATION MESSAGES IN A COMMUNICATIONS NETWORK

CROSS-REFERENCE TO RELATED APPLICATIONS

This Application is a Section 371 National Stage Application of International Application No. PCT/FR2016/052472, filed Sep. 29, 2016, the content of which is incorporated herein by reference in its entirety, and published as WO 2017/055749 on Apr. 6, 2017, not in English.

FIELD OF THE DISCLOSURE

The invention lies within the field of telecommunications, and relates more particularly to a method for controlling recommendation messages in a communications network.

BACKGROUND OF THE DISCLOSURE

A new protocol called SPUD (for "Substrate Protocol for User Datagrams"), which provides for the broadcasting of recommendation messages in a communications network between endpoints and entities in the network supporting this communication, is currently being finalized by the IETF (for "Internet Engineering Task Force") standardization authority. The IETF document "draft-hildebrand-spud-prototype-03" dated Mar. 9, 2015 and entitled "Substrate Protocol for User Datagrams (SPUD) Prototype" sets out, notably, a prototype SPUD protocol. According to this document, the SPUD protocol allows communication between two terminal points (known as "endpoints" in English) of a network via a "tube". In the terminology of this document, a tube is defined more particularly as a grouping of packets between two endpoints of the network. Such a tube is created by the endpoint that initiates a call to the second endpoint, and may be closed by one or other of the endpoints. The prototype SPUD protocol provides for two types of recommendation messages in the form of data packets called "packets carrying recommendation data relating to the application" ("Application Data packets") and data packets called "packets carrying recommendation data relating to the network path" ("Advisory Path Data packets"). The packets carrying application data are sent by endpoints. Each entity in the network participating in the tube created for the call relays these data packets to the recipient entity of the packets. For their part, the packets carrying recommendation data relating to the network path are sent by a control entity located on a network path of the tube between the two endpoints.

The prototype SPUD protocol proposed in the IETF document has a number of drawbacks. Specifically, according to this protocol, non-certified information from a sub-network participating in the establishment of the tube is transmitted to the endpoints, and the same non-certified information is taken into account in the recommendation messages. In fact, inappropriate recommendation messages may be sent and exchanged. By sending inappropriate recommendations, such messages may also cause a degradation of the network conditions, such as network congestion or a failure of network equipment.

SUMMARY

One of the objects of the invention is to overcome some deficiencies/drawbacks of the prior art and/or to make improvements thereto.

According to a first aspect, the invention relates to a method for controlling, in a communications network, recommendation messages exchanged during a session between a first endpoint, called the source entity, and a second endpoint, called the recipient entity, the messages being exchanged via a tube grouping data packets of a communications protocol with no guarantee of the delivery of the data packets, which method comprises:

obtaining recommendations contained in the recommendation messages via a control entity located on a network path of the tube, the control entity being authorized by an operator of the communications network;

calculating a new recommendation message on the basis of the recommendations obtained and of at least one information item relating to conditions of the network provided by the control entity; and sending the new recommendation message to at least one network entity located at one end of said tube.

Because of the method according to the invention, it becomes possible for the operator of the communications network to intervene in a session between two endpoints (e.g. user terminal) between which a tube has been established in order to group data packets of a communications protocol without a guarantee of delivery of these packets (e.g. the protocol called UDP, for "User Datagram Protocol"). Such a tube is, for example, a tube as defined in the prototype SPUD protocol described above. The intervention of the operator of the communications network has, in particular, the advantage of information relating to the network conditions to be taken into account for the calculation of recommendation messages intended for the network entities of the tube. Such recommendations may be used to inform the endpoints of the state of the network implementing the call, and therefore to improve the corrective actions of the endpoints if the network is in a degraded situation.

In case of network congestion it is possible, notably, for a service provider exchanging with a user terminal for example, to obtain a recommendation message correlated with the current network situation, so that the service provider can take this into account and choose a more appropriate network path. In the present state of the art, since the recommendation messages are not correlated with the operator's information on the network conditions, erroneous recommendation messages that tend to worsen the network situation may be sent (e.g. a recommendation message with an invitation to change an encoding level after the detection of an abnormally long buffer storage time).

According to a particular characteristic, the method comprises intercepting at least one recommendation message among the exchanged recommendation messages, the new calculated recommendation message replacing the at least one intercepted recommendation message.

The method may advantageously be used to filter the intercepted recommendation messages in order to control and limit the information exchanged in the network. The filtering may be used to limit the number of recommendation messages transmitted on the network, but also to control the content of the information transmitted to a third party, as well as modifications made to the recommendation messages by intermediate entities. In fact, messages exchanged between two endpoints may travel via network equipment whose credibility is uncertain. According to the method, the recommendation messages are intercepted by a control entity authorized by a network operator, allowing the authenticity of the exchanged recommendation messages to be ensured. Thus the control entity may advantageously not relay a recommendation message originating from a non-authenticated source, or more generally from a source that is not considered trustworthy. Similarly, such a message will not be taken into account in the calculation of a new recommendation message.

According to a particular characteristic, the method further comprises an aggregation of the recommendations obtained, the calculation of the new recommendation message taking into account the aggregated recommendations.

The information carried by a number of recommendation messages may advantageously be combined in a single recommendation message. It is thus possible to generate a recommendation message that brings together the recommendations obtained from a set of recommendation messages originating from different sources. In particular, the relevance of the calculated recommendation message, based on information relating both to the operator network enabling the call to be implemented between the endpoints, and also to application data exchanged between endpoints, is improved.

Moreover, an aggregated recommendation message, since it requires a smaller number of data packets or data packets of smaller size, makes it possible to transmit the same number of information items as would have been transmitted by the set of recommendation messages that resulted in the aggregated message.

The aggregation of the recommendations obtained may also reduce the number of messages transmitted, thus reducing the network load. This leads to an improvement in bandwidth usage, in the quality of the user experience, and more generally in the quality of service offered.

According to a second aspect, the invention relates to an entity for controlling, in a communications network, recommendation messages exchanged via a tube grouping data packets of a communications protocol with no guarantee of the delivery of the data packets, between a first endpoint, called the source entity, and a second endpoint, called the recipient entity, the control entity being located on a network path of the tube and authorized by an operator of the network, which entity comprises:
- a first obtaining module, arranged to obtain recommendations contained in the recommendation messages;
- a second obtaining module, arranged to obtain at least one information item relating to conditions of the network;
- a calculation module, arranged to calculate a new recommendation message on the basis of the recommendations obtained by the first obtaining module, and of at least one information item relating to conditions of the network obtained by the second obtaining module; and
- a sending module, arranged to send the new recommendation message to at least one network entity located on a network path of the tube.

According to a particular characteristic, the control entity further comprises an interception module, arranged to intercept at least one recommendation message among the exchanged recommendation messages, the calculation module being arranged to replace the at least one intercepted recommendation message with the new recommendation message.

According to a particular characteristic, the control entity further comprises an aggregation module, arranged to aggregate the recommendations obtained by the first obtaining module, the calculation module being arranged to calculate the new recommendation message by taking into account the recommendations aggregated by the aggregation module.

According to a particular characteristic, the control entity further comprises an encryption module, arranged to encrypt the new recommendation message before it is sent by the sending module.

The advantages stated for any of the characteristics of the control method according to the first aspect are directly transferable to the control entity according to the second aspect.

According to a third aspect, the invention relates to a system for controlling, in a communications network, recommendation messages exchanged via a tube grouping data packets of a communications protocol with no guarantee of the delivery of the data packets, between a first endpoint, called the source entity, and a second endpoint, called the recipient entity, which system comprises:
- said source and recipient entities;
- at least one control entity for controlling recommendation messages according to the second aspect.

According to a particular characteristic, the source entity is a user terminal, the recipient entity is a server, and the control entity is also managed by an operator of the communications network.

The advantages stated for any of the characteristics of the control method according to the first aspect are directly transferable to the system according to the third aspect.

According to a fourth aspect, the invention also relates to a program for a control entity, comprising program code instructions intended to command the execution of the steps of the method described above, when said program is executed by said control entity, and a recording medium, readable by a control entity, on which a program for a control entity is recorded.

BRIEF DESCRIPTION OF THE DRAWINGS

The invention will be more readily understood with the aid of the following description of particular embodiments, with reference to the attached drawings, in which.

DETAILED DESCRIPTION OF ILLUSTRATIVE EMBODIMENTS

Figure 1:
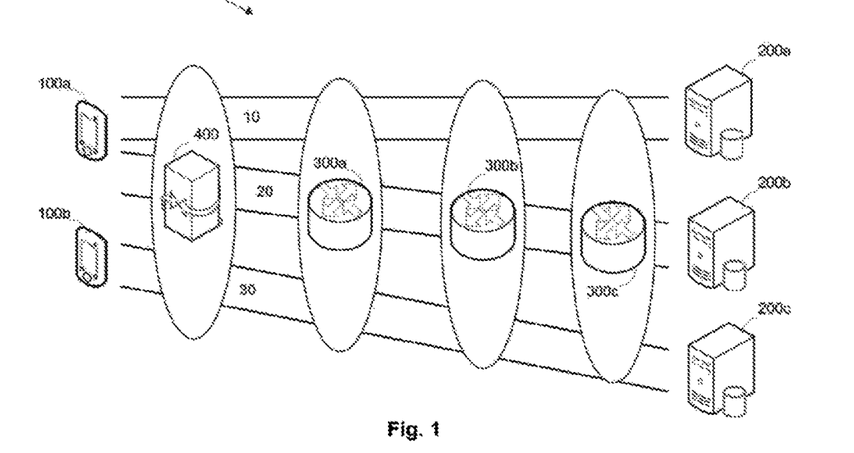
FIG. 1 shows a system for controlling recommendation messages according to a particular embodiment.

FIG. 1 shows a system, in a communications network 1, for controlling recommendation messages according to a particular embodiment. The system comprises a control entity 400, together with endpoints 100a-b, 200a-c.

The endpoints 100a and 100b are, for example, user terminals (e.g. cellphones, tablets, or computers), and the endpoints 200a-c are content servers of a service provider. The control entity 400 is, for example, a home gateway allowing a user of the user terminals 100a-b to access the communications network 1. Also by way of example, we shall then assume that the endpoints 100a and 100b are tablets with respective screen definitions of 4K UHD, for "Ultra High Definition" (i.e. 3840×2160 pixels) and 1080p (i.e. 1920×1080 pixels).

The user terminal 100a communicates with the content servers 200a and 200b via a tube 10 and a tube 20 respectively, as defined in the aforementioned IETF document "draft-hildebrand-spud-prototype-03". Similarly, the user terminal 100*b* communicates with the content server 200*c* via a tube 30. In accordance with the IETF document, the data packets exchanged between the endpoints via tubes associated with them have no guarantee of delivery. By way of example, the data packets are those of the protocol called UDP (for "User Datagram Protocol"). More precisely the three tubes 10, 20 and 30 each correspond to a session, called a "SPUD session", between the user terminal 100*a* and the content server 200*a*, the user terminal 100*a* and the content server 200*b*, and the user terminal 100*b* and the content server 200*c*, respectively. Each of the SPUD sessions is itself associated with a service session between the same entities. By way of example, we will assume that a WebRTC (for "Web Real-Time Communication") session S1 is in progress between the endpoint 100*a* and the endpoint 200*a*. The tube 10 is associated with the session S1. Similarly, we will assume that two continuous video streaming sessions S2 and S3 are in progress, respectively, between the endpoints 100*a* and 200*b* on the one hand, and between the endpoints 100*b* and 200*c* on the other hand. The tubes 20 and 30 are associated with the sessions S2 and S3 respectively.

The user terminals 100*a-b* are also entities called "source entities", because they initiate the SPUD sessions. In the same way, the content servers 200*a-c* are entities called "recipient entities", because they receive requests for SPUD session establishment from the endpoints 100*a-b*. When the SPUD sessions are established, the user terminals 100*a-b* and the content servers 200*a-c* may also be either transmitters or receivers of the messages traveling via the tubes 10, 20 and 30. The messages traveling via the tubes 10, 20 and 30 comprise, more particularly, recommendation messages sent by an endpoint to another endpoint.

The control entity 400 is an entity authorized by an operator of the communications network 1. It is located on, respectively, a network path associated with the tube 10, a network path associated with the tube 20, and a network path associated with the tube 30. In the context of the invention, a network path is more particularly defined by a sequence of network entities through which the calls associated with a tube travel between two endpoints. The network entities forming a network path may or may not be authorized by the operator of the communications network 1. An entity of a network path which is authorized by the network operator is called "trusted". One or more trusted entities also form a "trusted domain". Thus a tube covers one or more domains, depending on whether a network path associated with it passes through one or more network entities authorized by the operator of the communications network 1. In the present embodiment, by way of example, the network entities 300*a* and 300*c* are authorized by the network operator, while the entity 300*b* is not authorized, and is therefore not considered to be a trusted entity or to belong to a trusted domain. Also by way of example, the entities 300*a* and 300*b* are routers, and the entity 300*c* is a firewall. Thus the tube 20 covers a trusted domain and a domain not authorized by the network operator. It should also be noted that, for a given tube between two endpoints, there may be a plurality of distinct associated network paths.

In another embodiment, the control entity 400 may be any trusted entity authorized by an operator of the communications network 1 (e.g. a DSLAM, for "Digital Subscriber Line Access Multiplexer", or a router).

Figure 2:
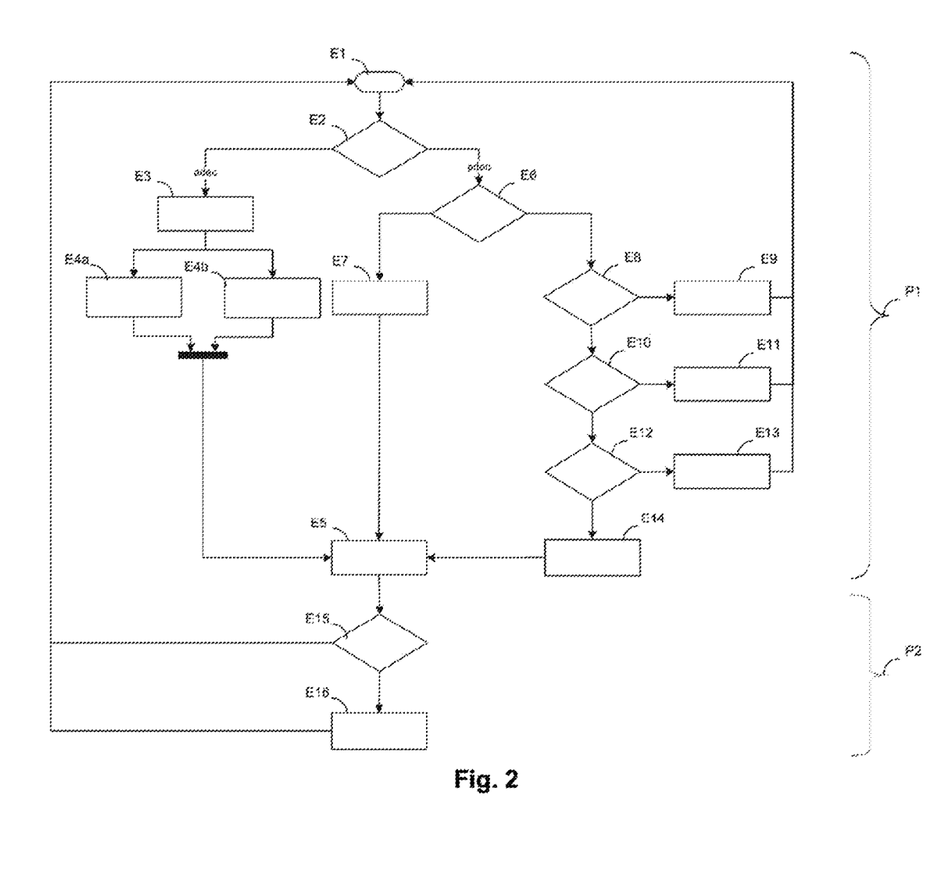
FIG. 2 shows a synoptic diagram of the steps of the control method executed by a control entity according to a particular embodiment.

FIG. 2 shows a synoptic diagram of the steps of the control method executed by a control entity 400 according to a particular embodiment.

By way of illustration, we will assume hereafter that we are in the configuration described above with reference to FIG. 1. We will assume, notably, that the control entity 400 is authorized by an operator of communications networks 1, and is located on a network path of the tubes 10, 20 and 30 respectively. More particularly, the method comprises two phases, P1 and P2. Phase P1 is a phase of obtaining recommendations contained in said recommendation messages. Phase P2 corresponds to the calculation of new recommendations, based, notably, on the recommendations obtained in phase P1.

Phase P1 consists of the steps E1 to E14 and will now be described.

In step E1, the control entity 400 is waiting for a recommendation message. A recommendation message has the following format, by way of example:

(SessionId; SrcId; DestId; Token; BroadcastFlag; (Reco))

SessionId is a session identifier, SrcId is an identifier of the source entity of the message, DestId is an identifier of the recipient entity of the message, Token is a parameter indicating whether the message has been sent by an entity of a trusted domain, and Reco is a set of parameters corresponding to a recommendation. The parameter BroadcastFlag is optional and may be used to authorize the reading of a recommendation message by an intermediary entity without this entity necessarily being the recipient of the message.

On receiving a recommendation message, the control entity 400 verifies the type of recommendation message received. More precisely, the control entity 400 verifies whether the recommendation message is a message in the form of data packets carrying recommendation data relating to the application or in the form of data packets carrying recommendation data relating to the network path. For this purpose, the control entity 400 verifies, respectively, whether an "adec" or "pdec" bit set to 1 is contained in the header of the message received (see section 4, IETF document "draft-hildebrand-spud-prototype-03").

If the message received is formed of data packets carrying recommendation data relating to the application ("apec" bit set to 1), the control entity 400 executes steps E3 to E5.

In step E3, the recommendation message is duplicated. Thus the control entity 400 has a duplicated version of the recommendation message which it can modify without altering the recommendation message received.

In step E4*a*, the control entity 400 relays the recommendation message received to its recipient, via the address of the latter contained in a header of the message. The recommendation messages sent by an endpoint are thus systematically sent to their recipient.

In step E4*b*, the control entity 400 executes a step of enriching the message received. This enrichment consists in the addition of information obtained by the control entity 400 in the duplicated recommendation message. This information relates, for example, to an endpoint (e.g. the type of terminal used) or alternatively to a user of an endpoint subscribed to at least one service of the operator of the communications network 1 (e.g. the user profile). The information that can be used for enrichment are obtained, for example, by interrogating a database of subscriber profiles.

In step E5, the recommendations that have been duplicated and then enriched in step E4*b* are stored in a table T.

If, in step E2, the recommendation message received is formed of data packets carrying recommendation data relating to the network path ("pdec" bit set to 1), the control entity 400 executes a step E6 of verifying that the recommendation message received has been sent by a trusted entity, that is to say an entity approved by the operator of the communications network 1. For this purpose, the control entity 400 initially verifies the presence of a "Token" parameter in the recommendation message received. If this parameter is present, the control entity 400 then verifies its validity. If the parameter is valid, the control entity 400 then attempts to decrypt the recommendation, using a decryption key to which the parameter Token directs it. Since this parameter is only inserted into a recommendation message by the network entities authorized by the operator of the communications network 1, it can identify that the message has been sent by a trusted entity.

In step E7, if the recommendation message is verified as having been sent by a trusted entity, the control entity 400 intercepts it. The recommendation message is then replaced by a new recommendation message, the calculation of which will be detailed subsequently.

The control entity 400 then executes step E5 again, and the recommendation message is stored in table T.

In step E7, if the recommendation message is not verified as having been sent by a trusted entity, a set of tests provided by steps E8 to E14 is executed on the recommendation message.

In step E8, the control entity 400 verifies that the recommendation message is not a malicious message. This includes, in particular, verifying that the recommendation message does not originate from a source considered to be malicious (such as a server belonging to a list of servers identified as malicious by the operator of the communications network 1).

In step E9, after the recommendation message has been verified as being malicious, the control entity 400 deletes it and resets itself to await the next recommendation message (step E1).

If the recommendation message is not malicious, the control entity 400 verifies, in step E10, that the recommendation message is verifiable. Such a recommendation message is said to be verifiable if at least one information item in the message may be verified by a simple measurement for confirming this information item.

If the recommendation message is not verifiable, the control entity 400 relays it, in step E11, to its recipient or recipients, and then resets itself to await the next recommendation message (step E1).

If the recommendation message is verifiable, the control entity 400 analyzes, in step E12, the measurement made in order to confirm the at least one information item carried by the message. If this at least one information item is not confirmed, the control entity 400 deletes the recommendation message (step E13), then resets itself to await the next recommendation message (step E1).

If, however, the at least one information item carried by the recommendation message is confirmed in step E12, the control entity 400 relays the recommendation message to its recipient in step E14, and stores a copy of the message in table T in step E5, as described above.

At the end of phase P1, table T has, by way of illustration, the following content:

| Row No. | SessionId | SrcId | DestId | Token | Broadcast Flag | Reco |
|---|---|---|---|---|---|---|
| 1 | S1 | @IP100a | @IP200a | 0 | 0 | (type: WebRTC, res: 4K, Device-type: tablet, resolution = 480p) |
| 2 | S2 | @IP100a | @IP200b | 0 | 0 | (type: videostream, res: 4K, Device-type: tablet, resolution = 480p) |
| 3 | S3 | @IP100b | @IP200c | 0 | 0 | (type: videostream, res: 1080p, Device-type: TV, resolution = 1080p) |
| 4 | S1 | @IP300a | — | t | 0 | (Eq-type: router, congestion = true, maxBDW = 500 Mb/s, availableMarking = BE, availableBDW = 3 Mb/s) |
| 5 | S2 | @IP300a | — | t | 0 | (Eq-type: router, congestion = true, maxBDW = 500 Mb/s, availableMarking = BE, availableBDW = 3 Mb/s) |
| 6 | S3 | @IP300a | — | t | 0 | (Eq-type: router, congestion = true, maxBDW = 500 Mb/s, availableMarking = (BE, AF42) availableBDW = BE = 3 Mb/s, AF42 = 30 Mb/s) |
| 7 | S1 | @IP300c | — | t | 0 | (Eq-type: firewall, bindingTTL = 20 s, maxBDW = 100 Gb/s) |
| 8 | S2 | @IP300c | — | t | 0 | (Eq-type: firewall, bindingTTL = 20 s, maxBDW = 100 Gb/s) |
| 9 | S3 | @IP300c | — | t | 0 | (Eq-type: firewall, bindingTTL = 20 s, maxBDW = 100 Gb/s) |

Table T stores the recommendations relating to sessions S1, S2 and S3 described above with reference to FIG. 1. The first three rows of table T have been filled in on the basis of messages in the form of data packets carrying application data, while the other rows of table T originate from messages in the form of data packets carrying recommendation data relating to a network path.

Table T indicates, in particular, that the endpoint 100*a* with the address @IP100a has sent a recommendation message to the endpoint 200a with the address @IP200a. The recommendation also indicates that the type of service session S1 concerned is a WebRTC session, and that the screen definition of the endpoint is what is known as 4K definition. Similarly, table T indicates that the endpoint 100a has sent a recommendation message to the endpoint 200b with the address @IP200b. The latter recommendation indicates that the service session S2 with which the recommendation is associated is a continuous video streaming session, and also repeats the screen definition of the endpoint 100a. The third row of table T indicates that the endpoint 100b has sent a recommendation message to the endpoint 200c with the address @IP200c, and that the recommendation relates to a service session S3 of continuous video streaming. The latter recommendation also indicates that the screen definition of the endpoint 100b is what is known as 1080p definition.

Rows 4 to 6 of table T store the recommendations sent by the network entity 300a with the address @IP300a for the sessions S1, S2 and S3 respectively. The recommendations for sessions S1, S2 and S3 indicate the type of equipment transmitting the recommendation ("Eq-type:router"), that the associated network path is saturated ("congestion=true"), the maximum permitted bandwidth for this network path ("maxBDW=500 Mb/s"), the type of policy followed ("availableMarking=BE", in which BE means "Best Effort"), and the available bandwidth ("availableBDW=3 Mb/s"). The recommendation for session S3 also specifies that a second policy is followed for this session ("availableMarking=(BE,AF42)"). This is because the term "AF42" indicates the possibility of using priority files for the transmission of the data packets transmitted in session S3. These priority files allow a maximum bandwidth of 30 Mb/s ("availableBDW=AF42=30 Mb/s"). Additionally, rows 4 to 6 of table T do not specify any destination addresses of the recommendation messages, because these messages are sent by the network entity 300a in tubes 10, 20 and 30, and are relayed to the endpoints by the set of network entities forming the network paths associated with tubes 10, 20 and 30. Such recommendation messages are known as "Advisory Path Data packets", for which no destination address has to be specified.

Finally, rows 7 to 9 of table T store the recommendations sent by the network entity 300c with the address @IP300c for the sessions S1, S2 and S3 respectively. These recommendations are identical. They indicate the type of equipment transmitting the recommendation ("Eq-type:firewall"), a lifetime of an inactive session ("bindingTTL=20s") and the available bandwidth ("availableBDW=100 Gb/s"). The recommendation messages in question are "Advisory Path Data packets", and do not specify a destination address.

Phase P2, in which new recommendations are calculated, will now be described. This phase comprises, more particularly, the steps E15 and E16.

The recommendation messages are stored by the control entity 400 until a condition of sending recommendations constructed from the previously received and enriched recommendation messages is verified in step E15. The sending of new recommendations generated by the control entity 400 takes place, for example, when the control entity 400 receives a data packet from an endpoint which is the recipient of a recommendation message that has been duplicated, thus indicating that the recommendation message has traveled along the whole network path between the control entity 400 and the recipient endpoint of the message.

If the condition of sending new recommendation messages is not verified, the control entity 400 resets itself to await the next recommendation message (step E1), and reiterates the steps of phase P1.

When the sending of the new recommendation messages has been verified, the control entity 400 executes a step E16 of calculating new recommendation messages. During this step, the control entity 400 calculates new recommendations on the basis of the recommendations obtained and of at least one information item relating to conditions of the network provided by the control entity 400. The calculation of new recommendations is carried out on the basis of a control policy defined by the operator and parameterized, for example, locally at the level of the control entity 400. Various control policies may be implemented, depending, notably, on the type of session (e.g. WebRTC for "Web Real-Time Communication", or TV service) between endpoints and/or on the existence of agreements on the routing of data between the operator and the supplier of the service in question.

By way of example, in the case of a policy of the operator intended to supply the best WebRTC service, a new recommendation message calculated by the control entity 400 may take the following form:

(S1, @IP400, @IP200a, t, 0,
(Eq-type:tablet, res:480p, maxBDW=500 Kb/s, Use TURNserver @TURNServer, DSCP:AF42, TTL:20s))

The parameter "Eq-type:tablet" indicates that the source endpoint to which the recommendation relates is a tablet. This information is obtained from the recommendations enriched and stored in steps E4b and E5. The control entity 400 obtains this information, for example, by consulting the list of equipment connected to it via the UPnP (for "Universal Plug and Play") protocol. The parameter "res:480p" indicates a definition recommended by the operator. The recommended definition is deduced according to the type of source endpoint, which is a tablet in the present embodiment. The maximum bandwidth (parameter "maxBDW=500 Kb/s") is deduced from the bandwidths indicated in the set of recommendations stored in table T for the same network path and from a maximum bandwidth authorized for a WebRTC session fixed at 500 Kb/s by the operator. In the embodiment described, the network path associated with the session S1 passes through the routers 300a and 300b, as well as through the firewall 300c. The set of recommendations contained in table T and sent by a trusted entity (authorized by the operator of the communications network 1) is taken into account for the calculation of the new recommendation. Since the router 300b has not been verified as trustworthy, the recommendations that it sends are not taken into account. The recommendations taken into account are therefore, more particularly, those of rows 4 to 9 of table T. The final value of bandwidth accepted for the new recommendation corresponds to the minimum between the maximum value defined for a WebRTC session (500 Kb/s) and the minimum of the bandwidths indicated in the recommendations sent by the trusted entities for the network path considered, that is to say the recommendations of rows 4 to 9 of table T. The last part of the recommendation also indicates the possibility of using priority access files ("Use TURNserver @TURNServer, DSCP:AF42"). Finally, the lifetime of the session contained in the new recommendation message corresponds to the minimum of the lifetimes of the sessions contained in the recommendations associated with the network path considered.

In the case of what is known as a "best effort" policy, without collaboration between the operator and the content supplier entities 200a-c, a new recommendation message takes the following form, for example:

(S2, @IP400, @IP200b, t, 0, (Eq-type:tablet, res:480p, maxBDW=2.5 Mb/s, TTL:20s))

In the same way as for the control policy described above, the parameter "Eq-type:tablet" indicates that the source endpoint to which the recommendation relates is a tablet. The parameter "res:480p" indicates a definition recommended by the operator. The maximum bandwidth (parameter "maxBDW=2.5 Mb/s") is deduced from the bandwidths indicated in the set of recommendations stored in table T for the same network path and from a maximum bandwidth authorized for a service and a type of source endpoint. In the embodiment described, the network path associated with the session S1 passes through the routers 300a and 300b, as well as through the firewall 300c. The set of recommendations contained in table T and sent by a trusted entity (authorized by the operator of the telecommunications network 1) is taken into account for the calculation of the new recommendation. Since the router 300b has not been verified as trustworthy, the recommendations that it sends are not taken into account. The recommendations taken into account are therefore, more particularly, those of rows 4 to 9 of table T.

The recommended bandwidth is also calculated on the basis of the recommendations relating to continuous video streaming sessions, that is to say the recommendations relating to sessions S2 and S3. The minimum available bandwidth (parameter "availableBDW") is initially obtained by the control entity 400, after which the latter then subtracts from this the bandwidth recommended for a WebRTC service which, as described above, is 500 Kb/s. The recommended bandwidth obtained for a continuous video streaming service is thus 2.5 Mb/s. The lifetime of the new recommendation message corresponds, as described above, to the minimum of the lifetimes of the recommendations associated with the network path considered.

Finally, in the case of a control policy focused on television services, with collaboration between the operator of the communications network 1 and the content suppliers 200a-c, a new recommendation message takes the following form, for example:

(S3, @IP400, @IP200a, t, 0,
(Eq-type:TV, res:1080p, maxBDW=12 Mb/s, Use TURN-server @TURNServer, DSCP:AF42, TTL:20s))

The parameters "Eq-type:TV", "res:1080p" and "TTL:20s" are calculated as described above for the previous two control policies. The recommended bandwidth corresponds to a maximum value of bandwidth recommended by the operator of the communications network 1 for a piece of equipment of the "TV" type, which is compatible with the bandwidth values indicated in the recommendations stored in table T, making use of priority files if necessary (as indicated by the parameter "AF42").

The recommendations calculated by the control entity 400 thus make it possible to improve the relevance of the recommendations received by the endpoints. In the absence of the control entity 400, if the information relating to the operator network and to the other sessions in progress is not taken into account, this may result in erroneous recommendations that may adversely affect the state of the network, for example when the network is saturated. More particularly, without the collaboration permitted by the control entity 400 between the operator of the communications network 1 and the service provider entities 200a-c, the recommendations sent for sessions S1, S2 and S3 would only take into account the software characteristics associated with the various services concerned. For the embodiments described, the result would be, for example, that only the definition requested by the source endpoints would be considered for each session. Thus, for sessions S1 and S2, there would be a recommended bandwidth of 70 Mb/s (the bandwidth for a definition of 4 K) and for session S3 there would be a recommended bandwidth of 2.5 Mb/s, whereas the available bandwidth would only be 3 Mb/s, that is to say 1 Mb/s of available bandwidth per session.

The new recommendations calculated in step E16 are sent after calculation to the endpoints, thereby terminating phase P2 of the control method.

The control entity 400 then resets itself to await the next recommendation message (step E1), and, on receiving the next recommendation message, reiterates the steps of phase P1 of the method.

In another embodiment, the parameter "Token" used to verify that a recommendation message has been sent from a trusted entity (step E6) is also used to request the control entity 400 to intercept such messages. It is thus possible to avoid encumbering the network by sending these recommendations outside the trusted domain that consists of the network entities authorized by the operator of the communications network 1.

In yet another embodiment, the parameter "Token" is also used to indicate an encryption type and/or key. It then allows trusted entities to encrypt/decrypt the recommendation messages. This operating mode is particularly advantageous if a network operator wishes to maintain the confidentiality of the recommendation messages sent by his network entities, or if, in the context of an agreement between the operator and a service provider for example, the same confidentiality is demanded by the service provider.

Steps E4a and E4b have been described with parallel execution. In another embodiment, these steps are executed sequentially.

In yet another embodiment, step E4b is optional.

In the embodiment described, the recommendation messages of the "Advisory Path Data packets" type do not specify a destination address. In another embodiment, the address of the recipient endpoint may be provided, in order, notably, to keep the headers of recommendation messages at a fixed size.

In step E5, the recommendations are stored in a table T. However, there is no limitation as to the type of data structure used. By way of example, the recommendations may be stored in a matrix, or alternatively in a simple list. Additionally, before the storage of a recommendation, an optional step of filtering the stored recommendations may be executed in order to reduce the amount of information stored. This filtering consists, for example, in preventing the recording of an information item that has already been recorded previously in the table, or alternatively in applying a policy defined by the operator in order to reject certain recommendations.

In another embodiment, in step E15 the sending of new recommendation messages generated by the control entity 400 is initiated by the expiry of a time delay. In yet another embodiment, the sending is initiated whenever the control entity 400 receives a recommendation message.

In another embodiment, the control entity 400 executes a step of aggregating the recommendations stored in step E5 at the end of phase P1. This aggregation step makes it possible, notably, to reduce the number of information items kept in storage by the control entity 400, and to optimize the calculation of new recommendations, which then takes into account a reduced set of recommendations.

Figure 3:
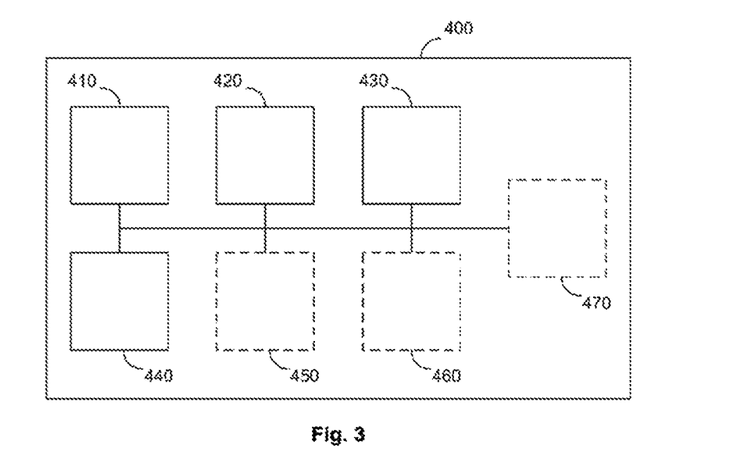
FIG. 3 shows a control entity arranged to control recommendation messages according to a particular embodiment.

FIG. 3 shows a control entity 400 for controlling, in a communications network, recommendation messages exchanged via a tube grouping data packets of a communications protocol with no guarantee of the delivery of the data packets, between a first endpoint, called the source entity, and a second endpoint, called the recipient entity. The control entity 400 is located on a network path of the tube and is authorized by an operator of the network. The control entity 400 comprises:

a first obtaining module 410, arranged to obtain recommendations contained in the recommendation messages;

a second obtaining module 420, arranged to obtain at least one information item relating to conditions of the network;

a calculation module 430, arranged to calculate a new recommendation message on the basis of the recommendations obtained by the first obtaining module, and of at least one information item relating to conditions of the network obtained by the second obtaining module; and a sending module 440, arranged to send the new recommendation message to at least one network entity located on a network path of the tube.

In a particular embodiment, the control entity 400 further comprises an interception module 450, arranged to intercept at least one recommendation message among the exchanged recommendation messages, the calculation module being arranged to replace the at least one intercepted recommendation message with the new recommendation message.

In another particular embodiment, the control entity 400 further comprises an aggregation module 460, arranged to aggregate the recommendations obtained by the first obtaining module, the calculation module being arranged to calculate the new recommendation message by taking into account the recommendations aggregated by the aggregation module.

In another particular embodiment, the control entity 400 further comprises an encryption module 470, arranged to encrypt the new recommendation message before it is sent by the sending module.

The invention is implemented by means of software and/or hardware components. In this context, the term "module" may equally well refer, in this document, to a software component, a hardware component, or a set of hardware and/or software components, adapted to perform a function or a set of functions as described above for the module in question.

A software component is considered to be one or more computer programs, one or more sub-programs of a program, or more generally any element of a program or a software package. Such a software component is stored in memory and is then loaded and executed by a data processor of a physical entity, and can access the hardware resources of this physical entity (memory devices, recording media, communications buses, input/output circuit cards, user interfaces, etc.).

Similarly, a hardware component is considered to be any element of a hardware assembly. It may be a hardware component, whether programmable or non-programmable, with or without an integrated processor for executing software. For example, it may be an integrated circuit, a chip card, a circuit card for executing microsoftware (firmware), etc.

In a particular embodiment, the modules 410, 420, 430, 440, 450, 460 and 470 are arranged to implement the control method described above. They are preferably software modules comprising software instructions for the execution of those of the steps of the control method described above, implemented by a control entity.

The invention therefore also concerns:

a program for a control entity, comprising program code instructions intended to command the execution of the steps of the control method described above, when said program is executed by said control entity;

a recording medium, readable by a control entity on which the program for a control entity is recorded.

The software modules may be stored in, or transmitted by, a data medium. This medium may be a hardware storage medium, for example a CD-ROM, a magnetic disk or a hard disk, or a transmission medium such as an electrical, optical or radio signal, or a telecommunications network.

Although the present disclosure has been described with reference to one or more examples, workers skilled in the art will recognize that changes may be made in form and detail without departing from the scope of the disclosure and/or the appended claims.

The invention claimed is:

1. A method for controlling, in a communications network, recommendation messages exchanged during a session between a first endpoint, called a source entity, and a second endpoint, called a recipient entity, said messages being exchanged via a tube grouping data packets of a communications protocol with no guarantee of the delivery of said data packets, wherein the method comprises the following acts by a control entity of the communications network:

obtaining recommendations contained in said recommendation messages via the control entity located on a network path of said tube, said control entity being authorized by an operator of said communications network;

calculating a new recommendation message on the basis of said recommendations obtained and of at least one information item relating to conditions of said network provided by said control entity; and sending said new recommendation message to at least one network entity located at one end of said tube.

2. The method as claimed in claim 1, further comprising intercepting at least one recommendation message among said exchanged recommendation messages, said new calculated recommendation message replacing said at least one intercepted recommendation message.

3. The method as claimed in claim 1, further comprising aggregating said recommendations obtained, said calculation of the new recommendation message taking into account said aggregated recommendations.

4. A control entity for controlling, in a communications network, recommendation messages exchanged via a tube grouping data packets of a communications protocol with no guarantee of the delivery of said data packets, between a first endpoint, called a source entity, and a second endpoint, called a recipient entity, said control entity being located on a network path of said tube and authorized by an operator of said network, wherein the control entity comprises:

a processor; and a non-transitory computer-readable medium comprising instructions stored thereon, which when executed by the processor configure the control device to perform acts comprising:

obtaining recommendations contained in said recommendation messages;

obtaining at least one information item relating to conditions of said network;

calculating a new recommendation message on the basis of said recommendations obtained by said first obtaining module, and of the obtained at least one information item relating to conditions of said network; and sending said new recommendation message to at least one network entity located on a network path of said tube.

5. The control entity as claimed in claim 4, wherein the instructions further configure the control entity to intercept at least one recommendation message among said exchanged recommendation messages, and to replace said at least one intercepted recommendation message with said new recommendation message.

6. The control entity as claimed in claim 4, wherein the instructions further configure the control entity to aggregate said recommendations obtained and to calculate said new recommendation message by taking into account said recommendations aggregated.

7. The control entity as claimed in claim 4, wherein the instructions further configure the control entity to encrypt said new recommendation message before said new recommendation message is sent by said sending module.

8. A system comprising the control entity as claimed in claim 4, and said source and recipient entities.

9. The system as claimed in claim 8, wherein said source entity is a user terminal and the recipient entity is a server, and wherein the control entity is also managed by the operator of said communications network.

10. A non-transitory computer-readable medium comprising a program stored thereon and comprising program code instructions for implementing a method of controlling, in a communications network, recommendation messages exchanged during a session between a first endpoint, called a source entity, and a second endpoint, called a recipient entity, when said program is executed by a control entity for controlling the recommendation messages, said recommendation messages being exchanged via a tube grouping data packets of the communications protocol with no guarantee of the delivery of said data packets, method comprises the following acts by the control entity:

obtaining recommendations contained in said recommendation messages via the control entity located on a network path of said tube, said control entity being authorized by an operator of said communications network;

calculating a new recommendation message on the basis of said recommendations obtained and of at least one information item relating to conditions of said network provided by said control entity; and sending said new recommendation message to at least one network entity located at one end of said tube.

* * * * *